United States Patent [19]

Iida et al.

[11] 4,377,911
[45] Mar. 29, 1983

[54] CONTOUR MEASURING INSTRUMENT

[75] Inventors: Jynichi Iida, Komae; Seiji Sakagami, Kawasaki, both of Japan

[73] Assignee: Mitutoyo Mfg. Co., Ltd., Tokyo, Japan

[21] Appl. No.: 235,461

[22] Filed: Feb. 18, 1981

[51] Int. Cl.³ .......................... G01B 5/20; G01B 7/28
[52] U.S. Cl. ............................. 33/174 L; 33/149 J; 33/174 P
[58] Field of Search .......... 33/174 L, 174 P, 174 Q, 33/149 J, 143 L

[56] References Cited

U.S. PATENT DOCUMENTS

| 3,319,340 | 5/1967 | Graham | 33/174 P |
| 3,987,551 | 10/1976 | Kienle | 33/174 L |
| 4,074,438 | 2/1978 | Takeda | 33/174 P |
| 4,141,148 | 2/1979 | Noguchi | 33/174 L |
| 4,265,022 | 5/1981 | Noguchi et al. | 33/174 P |

*Primary Examiner*—Willis Little
*Attorney, Agent, or Firm*—Flynn, Thiel, Boutell & Tanis

[57] ABSTRACT

A measuring instrument for measuring the contour of the outer surface of a workpiece. This measuring instrument is of such an arrangement that the tip end of a stylus solidly secured at one end of an arm adapted for rotational movement is brought into contact with the outer surface of the workpiece by a slight pressing force, the arm in this condition is moved in the axial direction thereof, and the displacement of the stylus tracing the irregularities of the outer surface of the workpiece to vertically move due to the abovedescribed movement is converted into the rotational movement of the arm, which is measured by measuring means such as a differential transformer, whereby the contour of the outer surface of the workpiece is measured from the vertical movement of the stylus and the axial (or horizontal) movement of the arm. The arm of the measuring instrument of this type has a dual construction adapted to be held in place by means of springs, wherein a mechanism for detecting the relative movement between these dual arms is provided, whereby a force exceeding a predetermined value applied to the stylus is detected, so that the breakage of the stylus, damages of the object to be measured and the like can be prevented.

12 Claims, 9 Drawing Figures

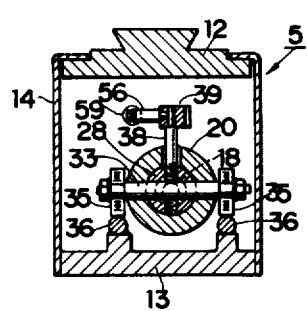

CONTOUR MEASURING INSTRUMENT

BACKGROUND OF THE INVENTION

1. Field of the Invention

The present invention relates to a contour measuring instrument of the type which takes measurement of the contour of an object to be measured by tracing its outer surface with a stylus secured to one end of an arm.

2. Description of the Prior Art

In general, in a contour measuring instrument, a stylus to be brought into contact with the outer surface of an object to be measured is secured to one end of an arm, the other end portion of this arm is rotationally supported by an arm support member, the center of gravity of the arm is held with the side of stylus being slightly heavier, so that the stylus can constantly be in abutting contact with the outer surface of the object to be measured. In measuring the contour of the outer surface of the object by use of the contour measuring instrument of this type, the arm support member is moved in the axial direction of the arm, the stylus is displaced in accordance with the contour of the outer surface of the object to be measured due to the movement of this arm support member so as to rotate the arm about its fulcrum where the arm is pivoted, the rotation of the arm is detected by use of contour signal detecting means such as a differential transformer, and the signal detected by this contour signal detecting means is combined with a signal for feeding arm support member to carry out the measurement of the contour of the object.

However, with such a conventional contour measuring instrument commonly used, a problem arises in that, when the stylus falls into a deep groove or the like, the stylus may be broken and the object to be measured may be damaged. More specifically, since no damage preventing mechanism for protecting the stylus and the like is provided in the conventional instrument, when the stylus falls into the deep groove or the like, the arm support member continues to be moved, and the stylus is brought into abutting contact with the wall surface of the groove under a strong pressing force, thus resulting in breakage of the stylus.

Furthermore, with such a conventional contour measuring instrument commonly used, due to rotational movement about a fulcrum where the arm is pivoted, the stylus follows circular arcs in motion, thus moving not only in the vertical direction but also in the feeding direction of the arm support member. Consequently, the movements in this feeding direction may form errors in measurement (errors in circular arcs), and, when there are considerable irregularities on the outer surface of the object to be measured, the errors may increase accordingly, hence rendering accurate measurement of the contour of the object with the stylus impracticable.

To overcome this problem, there has been proposed a mechanism wherein one end of a link bar is rotatably mounted on an end portion of an arm opposite to the side, to which a stylus is secured, through a cross spring, and the other end of the link bar is supported on an arm support member (slide plate) through a cross spring, whereby, when the arm is rotated, the link bar is rotated about the point supported on the arm support member, and due to this rotation, the arm is moved in a direction of correcting errors in the circular arcs, so that, finally, the tip end of the stylus can move substantially vertically, thereby enabling to avoid the occurrence of errors in the circular arcs, or a mechanism similar to the above, wherein parallel links are used in place of the link bar described above (Refer to Japanese Patent Application "Kokai" (Laid-Open) No. 53352/78).

However, in the conventional mechanism as described above, the link bar or parallel links for supporting the arm are required, and moreover, there has been such a disadvantage that the arm is not necessarily provided at the most preferable position, so that a force of an excessively high value may act upon the arm.

Further, in the conventional contour measuring instrument, a differential transformer as contour signal detecting means is mounted at a position spaced apart a predetermined distance from a plane incorporating therein the center of rotation of the arm and being in parallel to the feeding direction of an arm support member (hereinafter referred to as "reference plane"). More specifically, a core (magnet) of the differential transformer is projectingly provided in a direction perpendicular to the arm, and a coil of the differential transformer is fixed on the arm support member in a manner to include the core at the center thereof, whereby the center position of the core and coil in the axial direction thereof is necessarily spaced apart a predetermined distance from the abovedescribed reference plane incorporating therein the center of rotation of the arm. With this arrangement, there is such a disadvantage that the inclination value of the core in the coil is different depending on the movement of the arm, whether the arm moves upward above the reference plane or downward below the reference plane, thereby causing errors due to the difference. There has been developed such a mechanism wherein the core is secured to the arm not directly but through parallel links, so that, when the arm is rotated, the core can vertically move without being inclined in the coil. With such a contour measuring instrument, errors due to the direction of rotation of the arm can be prevented, however, such disadvantages are presented that the resultant complex construction results in increased costs and accumulated errors due to looseness and the like of connecting portions of the respective parts amount comparatively high due to the complex construction.

SUMMARY OF THE INVENTION

An object of the present invention is to provide a contour measuring instrument wherein a force exceeding a predetermined value applied to a stylus is detected so that breakage of the stylus or damages of an object to be measured can be prevented.

Another object of the present invention is to provide a contour measuring instrument having a simplified construction and being low in errors in measurement due to errors in circular arcs and the like.

A further object of the present invention is to provide a contour measuring instrument capable of preventing a force of an excessively high value from acting on an arm and the like.

The present invention contemplates that there are provided damage preventing means for detecting a pulling or pressing force acting upon the arm in the longitudinal direction thereof and circular arc error correcting means for correcting errors (errors in circular arcs) in the measured value due to shifts of the stylus in the moving direction of the arm caused by the displacement of the stylus following the contour of the object to be measured, thereby achieving protection of the stylus and decrease in errors of measurement.

The preferred embodiment of the damage preventing means for the stylus and the object to be measured according to the present invention is of such an arrangement that an arm to which a stylus is secured is constituted by a pair of arms slidable on each other in the axial direction, detecting means is provided for detecting the value of relative movement between the pair of arms when a force exceeding a predetermined value acts on one of the pair of arms to which the stylus is secured, whereby a force of an unusually high value acting on the stylus is detected, so that the movement of an arm support member can be stopped manually or automatically to remove the force of the unusually high value acting on the stylus.

The preferred embodiment of the error decreasing means according to the present invention is of such an arrangement that the center position of the core and coil of a differential transformer is set on the reference plane incorporating the center of rotation of the arm and being in parallel to the feeding direction of the arm support member when the tip end of the stylus is located at a position on the aforesaid reference plane (hereinafter referred to as an "arm reference position"), and, when the arm rotates in any direction, the core is adapted to move symmetrically so that the difference in the rotating direction thereof can be eliminated and complex construction can be avoided.

Further, the preferred embodiment of the circular arc error correcting means according to the present invention is of such an arrangement that a fixed fulcrum of a connecting link on the arm support member for causing the arm to correct errors in circular arcs is positioned on the reference plane as described above, and, when the tip end of the stylus is positioned on the reference plane, at least a section of the axial line of the arm disposed between the fixed fulcrum of the connecting link and the fulcrum where the arm is pivoted is adapted to be substantially aligned with the reference plane, whereby only a force substantially in the axial direction acts on the arm.

BRIEF DESCRIPTION OF THE DRAWINGS

FIGS. 5 through 7 are sectional views in the direction indicated by the arrows from lines V—V, VI—VI and VII—VII in FIG. 2, respectively;

FIG. 8 is a perspective view showing the connecting link in FIG. 2; and

FIG. 9 is an enlarged sectional view in the direction indicated by the arrows from line IX—IX in FIG. 3.

DETAILED DESCRIPTION OF THE PREFERRED EMBODIMENT

Figure 1:
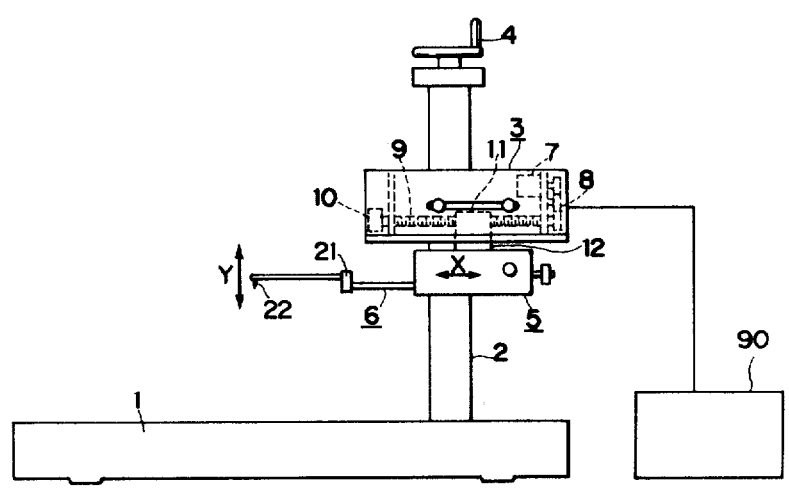
FIG. 1 is a front view showing the general arrangement of one embodiment of the contour measuring instrument according to the present invention.

FIG. 1 shows the outline of the general arrangement of one embodiment of the contour measuring instrument according to the present invention. Referring to the drawing, a support pole 2 is erected from a base 1 and secured thereto with an X-direction drive detecting mechanism 3 which is vertically movable along the support pole 2 by driving a handle 4. This X-direction drive detecting mechanism 3 is adapted to move a Y-direction detecting mechanism 5 in the direction X, i.e., in the axial direction of an arm or an arm assembly 6, which is hereinafter referred to briefly as an "arm 6", provided in the Y-direction detecting mechanism 5, and to detect the movement value thereof. The X-direction drive detecting mechanism 3 is provided therein with a driving motor 7, rotation of which is imparted to a feed screwshaft 9 through a gearing mechanism 8, and detected by a rotation detector 10 such as a rotary encoder. A nut member 11 is threadably coupled onto the feed screwshaft 9 and movable in the direction X by rotation of the feed screwshaft 9. Connected to this nut member 11 through a connector 12 is the Y-direction detecting mechanism 5 which is movable in the direction X along with the nut member 11.

FIGS. 2 through 9 detailedly show construction of the Y-direction detecting mechanism 5. In these drawings, the Y-direction detecting mechanism 5 is provided with an arm support member 13 made of a casting, and the longitudinal opposite surfaces and the upper surface of this arm support member 13 are covered with a cover 14 being of a letter 'C' shape in cross section and the end faces perpendicularly intersecting the longitudinal direction thereof are covered with side covers 15, 16. Disposed at the center of the upper surface of this cover 14 is the aforesaid connector 12 which is solidly secured to the arm support member 13 through three stud pins 17 (Refer to FIG. 3).

Figure 2:
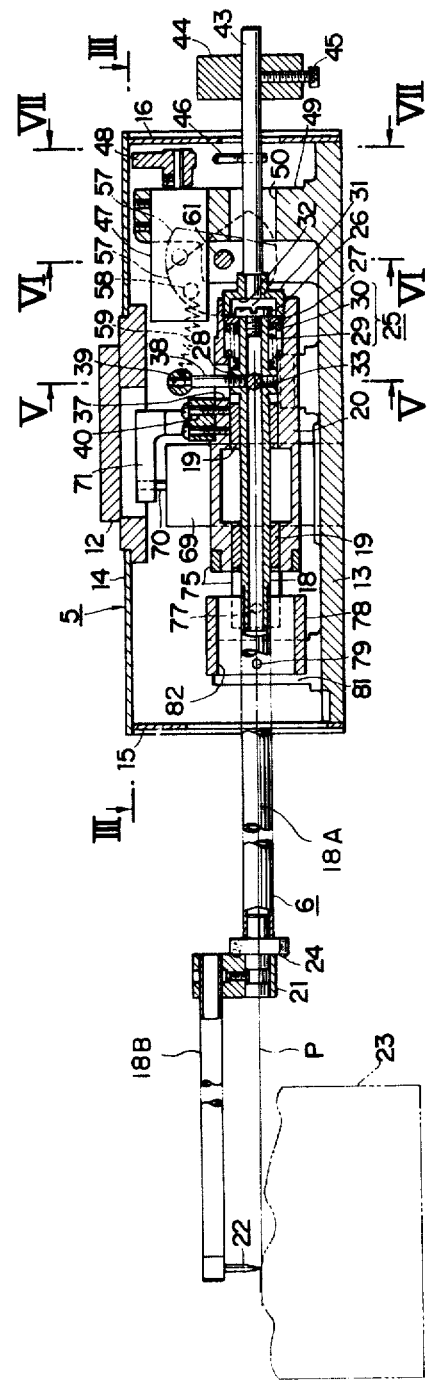
FIG. 2 is an enlarged sectional view of the essential portions of FIG. 1.
Figure 4:
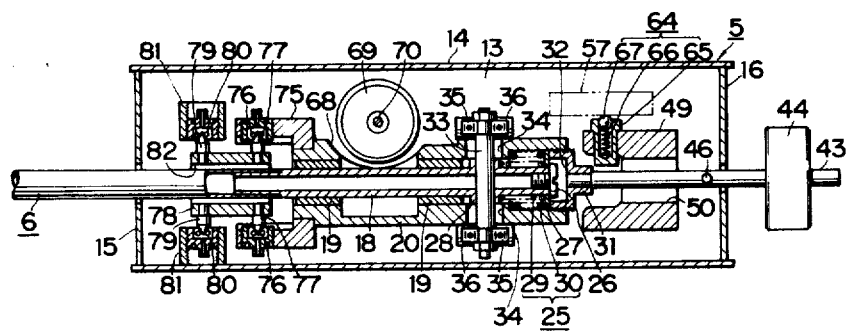
FIG. 4 is a sectional view taken along substantially the axial line of the arm in FIG. 2.

As shown in FIGS. 2 and 4, the arm 6 consists of a pair of arms including a first arm 18 being of a substantially tubular shape having a small diameter and a second arm 20 being of a substantially tubular shape having a large diameter and adapted to receive therein the first arm 18 through a bush 19. The first arm 18 includes a proximal arm 18A is inserted into the second arm 20 and a distal arm 18B extended from the forward end of the proximal arm 18A through a joint 21. One end of the proximal arm 18A projected from the second arm 20 and the distal arm 18B are formed into thin wall pipes for the purpose of rendering light weight, and a stylus 22 is solidly secured to the forward end of the distal arm 18B in a manner to project in the radial direction. Furthermore, the distal arm 18B can be inverted in the vertical direction at the portion of the joint 21, so that the stylus 22 can be also directed upward not only downward as shown, thereby enabling to measure not only the upper surface of an object 23 to be measured but also the upper wall in a transverse hole thereof. In this case, the joint 21 is provided with a stopper mechanism 24 including balls biased by springs, respectively, and sockets and the like, so that the joint 21 can be stopped at a position inverted through 180° accurately. Further, the joint 21 is adapted to rotate on the center axis of the second arm 20 so that, even if the stylus 22 is inverted in its direction, the tip end of the stylus 22 can be in the same position as before the inversion.

The first arm 18 and the second arm 20 are adapted to slide on each other in the axial direction thereof, and normally both arms are adapted to keep a predetermined positional relationship therebetween through the agency of energizing means 25 which includes first and second compression coil springs 29, 30 to be described hereinafter. More specifically, a set-screw 26 is solidly secured to the right end of the first arm 18 in FIG. 2, a sliding disk 27 is slidably coupled onto the outer periphery of the first arm 18 at a position to the left of the set-screw 26, and the first compression coil spring 29 constituting a portion of the aforesaid energizing means 25 is confined between the sliding disk 27 and a flange 28 integrally formed on the first arm 18, thereby constantly bringing the sliding disk 27 into abutting contact with the head of the set-screw 26. Furthermore, the outer periphery of the sliding disk 27 is made slidable on the inner periphery of the second arm 20, and the second compression coil spring 30 constituting the remaining portion of the energizing means 25 is confined between the sliding disk 27 and an inner diameter stepped portion of the second arm 20, whereby the sliding disk 27 is brought into abutting contact with the inner end face of a box nut 31 threadably coupled into the right end of the second arm 20 through the agency of the second compression coil spring 30. Formed on the inner end face of this box nut 31 is a recess 32, within which the head of the set-screw 26 is movable in the axial direction of the set-screw 26. With the arrangement as described above, the sliding disk 27 is pressed against the inner end face of the box nut 31 through the agency of the second compression coil spring 30, while, the set-screw 26 is pressed against the right end face of the sliding disk 27 through the agency of the first compression coil spring 29, whereby the first and second arms 18, 20 are normally held in the condition as shown. If, in this condition, the first arm 18 is pressed rightward in FIG. 2 by a force higher in value than the energizing force of the first compression coil spring 29, then the first arm 18 moves rightward against the energizing force of the first compression coil spring 29, whereby the sliding disk 27 is brought out of abutting contact with the set-screw 26. Whereas, if the first arm 18 is pulled leftward in FIG. 2 by a force higher in value than the energizing force of the second compression coil spring 30, then the sliding disk 27 is pressed leftward by the head of the set-screw 26 solidly secured to the right end of the first arm 18, whereby the first arm 18 moves leftward along with the sliding disk 27 against the energizing force of the second compression coil spring 30.

Inserted through the flange 28 of the first arm 18 in the horizontal direction, i.e., in a direction perpendicularly intersecting the paper surface in FIG. 2 is a fulcrum shaft 33, opposite end portions of which are projected from the second arm 20 through a slot 34 formed in the second arm 20, and bearings 35 are mounted on the abovedescribed projected portions, respectively. These bearings 35 are brought into abutting contact with a pair of needles 36 (Refer to FIG. 5), which constitute an imaginary straightened guide surface and are solidly secured to the arm support member 13, whereby the arm 6 constituted by the pair of first and second arms 18, 20 is rotatably and axially slidably supported on the fulcrum shaft 33 serving as the fulcrum where the arm 6 is pivoted. The bearings 35 and needles 36 here comprise a guide means.

Furthermore, the central portion of the fulcrum shaft 33 is fixed by means of a screw shaft 38 inserted through a slot 37 (Refer to FIG. 2) formed on the upper surface of the second arm 20. Solidly secured to the upper end portion of this screw shaft 38 is an actuating member 39, against which abuts a working arm 42 of a microswitch 41 serving as detecting means and secured to the outer periphery of the second arm 20 through a bracket 40. With the abovedescribed arrangement, if the first arm 18 moves against the energizing means 25 to make a relative movement with the second arm 20, then the relative movement can be detected by the microswitch 41, which is connected to a power source circuit of the driving motor 7 described in FIG. 1, and, when actuated by the actuating member 39, the microswitch 41 turns 'OFF' the power source circuit of the driving motor 7.

Solidly secured to a core portion of the box nut 31 mounted on the right end of the second arm 20 is one end of a balance shaft 43 extended in the axial direction of the arm 20, and the other end of the balance shaft 43 is extended outwardly from the side cover 16. A balance weight 44 is mounted on the extended portion of the balance shaft 43 in a manner to be movable in the axial direction of the balance shaft 43, and may be fixed in place by means of a bolt 45. In the case of normal measurement where the stylus 22 is directed downward as shown in FIG. 2, the fixed position of the balance weight 44 is determined such that the weight of the arm 6 and of a portion from the fulcrum shaft 33 to the end of stylus 22 out of a section integrally formed on the arm 6 and rotating about the fulcrum shaft 33 is slightly heavier than the weight of a portion from the fulcrum shaft 33 to the end of the balance weight 44 out of the abovedescribed section. With the abovedescribed arrangement, the arm 6 on the side of stylus 22 is lowered in the free condition of the arm 6, and the stylus 22 is adapted to be brought into abutting contact with the outer surface of the object 23 to be measured by a slight contacting force.

Erected from the intermediate portion of the balance shaft 43 is a pin 46 which is opposed to an eccentric cam 48 fixed on an output shaft of a DC motor 47. With this arrangement, if the motor 47 is driven and the eccentric cam 48 is brought into abutting contact with the pin 46, then the side of balance weight 44 of the arm 6 is pressed down and the side of stylus 22 of the arm 6 is raised, whereby the stylus 22 is brought out of abutting contact with the object 23 to be measured. While, if the motor 47 is stopped in operation by the largest eccentric portion (the position of the largest diameter) of the eccentric cam 48, then the arm 6 is stopped at a position where the stylus 22 is disposed at a position farthest from the object 23 to be measured. Further, if the motor 47 is driven again from the stopped position as described above, then the pin 46 is slowly raised by a weight unbalancing force of the arm 6 while being in abutting contact with a cam surface of the eccentric cam 48, so that the stylus 22 can be slowly brought into abutting contact with the outer surface of the object 23 to be measured, thereby enabling to prevent the stylus 22 from being broken and the like. Furthermore, the DC motor 47 is solidly secured through screws to a stand 49 integrally erected from the arm support member 13, and the balance shaft 43 is extended through a through-hole 50 formed in the stand 49. Further, as shown in FIG. 7, limit switches 51, 52 are secured to opposite sides of the upper portion of the stand 49, respectively, and, working arms 53, 54 of these limit switches, 51, 52 can be brought into abutting contact with an actuating pin 55 mounted on a hub portion of the eccentric cam 48. These limit switches 51, 52 are connected to the power source circuit of the DC motor 47, and, when actuated by the actuating pin 55, adapted to turn 'OFF' the power source for the DC motor 47 so as to stop the DC motor 47 in operation. With the abovedescribed arrangement, if the limit switch 51 is actuated, then the motor 47 is stopped in operation with the largest diameter position of the eccentric cam 48 is disposed at a position farthest from the pin 46 of the balance shaft 43 as shown in FIG. 7. While, if the limit switch 52 is actuated, then the largest diameter position of the eccentric cam 48 comes into abutting contact with the pin 46, whereby the motor 47 is stopped in operation at the elevated position of the stylus 22.

A spring engaging pin 56 is horizontally planted in the actuating member 39 fixed to the upper end of the screw shaft 38 for fixing the fulcrum shaft 33 to the first arm 18, and a coil spring 59 is stretched between this spring engaging pin 56 and a spring engaging pin 58 provided on a rotary member 57. As shown in FIG. 6, this rotary member 57 is solidly secured to one end of a rotary shaft 61 rotatably supported by a pair of stands 60 integrally erected on the arm support member 13. Threadably coupled into the other end of this rotary shaft 61 is a finger grip 62 which is unrotatably coupled to the rotary shaft 61 by means of a pin 63. A large diameter portion for operation of this finger grip 62 is projected outwardly from the cover 14, and, rotation of the finger grip 62 outwardly of the cover 14 causes the rotary member 57 to be rotated and moved from a position indicated by a broken line to a position indicated by a chain line in FIG. 2. A click motion mechanism 64 is provided between one side surface of this rotary member 57 and one of the stands 60 for regulating the angular rotation of the rotary member 57. This click motion mechanism 64 includes a socket 65 secured to the stand 60, a compression spring 66 received in the socket 65 and a ball 67 being constantly pressed against one side surface of the rotary member 57. The ball 67, when being coupled into one of recesses formed at one side surface of the rotary member 57, gives feeling of an intermittent and positive motion. Furthermore, the coil spring 59 stretched between the spring engaging pins 56 and 58 is in a slackened condition having no energizing force when it is in position indicated by a broken line in FIG. 2, i.e., in the normal condition. Whereas, if the finger grip 62 is rotated to bring the rotary member 57 into the position indicated by the chain line in FIG. 2, then a tencile force is generated in the coil spring 59 which gives a turning force to the arm 6 through the screw shaft 38 to rotate about the fulcrum shaft 33 in the clockwise direction in FIG. 2. With the abovedescribed arrangement, in the case the rotary member 57 is turned to the position indicated by the chain line, if the left end portion of the first arm 18 shown in FIG. 2 is inverted at the portion of joint 21 through 180° to direct the stylus 22 upward, then a contacting force of a predetermined value is applied to the tip end of the stylus 22, so that the stylus 22 can be brought into abutting contact with the upper surface and the like of a transverse hole formed in the object 23 to be measured under the contacting force of the predetermined value, thereby enabling to carry out measurement without changing the position of the balance weight 44.

Figure 3:
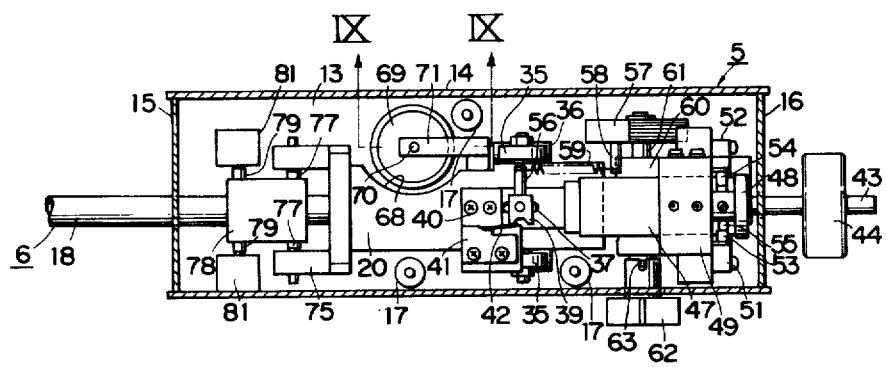
FIG. 3 is a sectional view in the direction indicated by the arrows from line III—III in FIG. 2.

As shown in FIGS. 3 and 4, a cutout 68 is formed at one side of the central portion of the second arm 20, and a differential transformer 69 serving as contour signal detecting means erected on the arm support member 13 within the cutout 68. A core shaft 70 of this differential transformer 69 is secured to the outer periphery of the second arm 20 through a bracket 71, so that the value of rotation of the second arm 20 about the fulcrum shaft 33 can be measured. Furthermore, as enlargedly shown in FIG. 9, a coil 73 is housed in a casing 72 of the differential transformer 69, and the center of this coil 73 in the vertical direction in FIG. 9 incorporates therein the center axis of rotation of the arm 6, i.e., the center axis of the fulcrum shaft 33 and positioned on a reference plane P in parallel to the feeding direction of the arm support member 13 as indicated by a doubleheaded arrow X in FIG. 1, whereby distances L from a point, where the reference plane P traverses the coil 73, to the upper and lower opposite end faces of the coil 73 are equal to each other. Furthermore, the core shaft 70 is extended into a center hole of the coil 73, and solidly secured thereto with a core 74 in the center hole. The position, where the core 74 is secured, is determined such that, when the arm 6 is positioned in such a manner that the tip end of the stylus 22 is set on the reference plane P (hereinabove referred to as an "arm reference position"), the center of the core 74 is set on the reference plane P, whereby the distances L from the point, where the reference plane P traverses the core 74, to the upper and lower opposite end faces of the core 74 are equal to each other.

A support link 75 of an inverted letter 'C' shape in plan view is solidly secured to the left end of the second arm 20 in FIGS. 2 to 4. Rotatably supported across opposite ends of the letter 'C' shaped opening of this support link 74 is one end of a connecting link 78 through a bearing 76 and a pivot 77. The other end of this connecting link 78 is rotatably supported by a pair of stands 81 integrally erected from the arm support member 13 through a pivot 79 and a bearing 80, and this supporting portion serves as a fixed fulcrum for the connecting link 78. As shown in FIG. 8, this connecting link 79 is formed such that opposite sides of a cylinder having a through-hole 82 being of an elliptic shape in cross section in the axial direction thereof are planed off, the pivots 77, 79 are projected from this planed surfaces, and the first arm 18 extends through the through-hole 82 with a distance of a predetermined value from the wall of the through-hole 82 being held therearound. Circular arc error correcting means of the arm 6 includes the support link 75, bearings 76, 80, pivots 77, 79, connecting link 78 and stands 81 of the arm support member 13. Positioned on the reference plane P incorporating therein the fulcrum where the arm 6 is pivoted, i.e., the center axis of the fulcrum shaft 33 and being in parallel to the feeding direction of the arm support member 13, i.e., the direction indicated by the arrow X is the fixed fulcrum for the connecting link 78, i.e., the center line of the pivot 78. Furthermore, when the tip end of the stylus 22 is positioned on the reference plane P, i.e. at the arm reference position, at least a section of the axial line of the arm 6 disposed between the fulcrum where the arm 6 is pivoted and the fixed fulcrum of the connecting link 78 is adapted to be positioned substantially on this reference plane P, so that the force applied to the arm 6 can be a tension or compression substantially in the axial direction of the arm 6.

In addition, in FIG. 1, designated at reference numeral 90 is a recorder, which is a so-called X-Y recorder, for receiving a signal of rotation value of the feed screwshaft 9 from the rotation detector 10, i.e., a signal of movement value of the Y-direction detecting mechanism 5 in the direction X and a signal of movement value in the direction Y (feed signal) of the arm 6 from the differential transformer 69 of the Y-direction detecting mechanism 5, and combining the both signals, thereby enlargingly illustrating the contour of the outer surface of the object 23 to be measured on a record paper.

Description will hereunder be given of action of this embodiment.

The object 23 to be measured is rested on the base 1 directly or through a predetermined mount or the like. Subsequently, the handle 4 is rotated to set the stylus 22 in the vertical direction (direction Y) through the X-direction drive detecting mechanism 3 and the Y-direction detecting mechanism 5 and the driving motor 7 of the X-direction drive detecting mechanism 3 to set the stylus 22 in the lateral direction (direction X), so that the stylus 22 can be opposed to a starting position of a portion to be measured of this object 23 through a proper gap. In this case, the DC motor 47 for driving the eccentric arm 48 is stopped in operation in the condition where the largest diameter portion of the eccentric cam 48 is in abutting contact with the top of the pin 46. With this arrangement, the stylus 22 is stopped at an elevated position above the measuring position, and, by the position setting as described above, the stylus 22 is positioned slightly above the left end portion of the object 23 to be measured shown in FIG. 2.

Then, if the DC motor 47 is driven to rotate the eccentric cam 48, then, because the weight of the portion of the arm 6 from the fulcrum shaft 33 to the end of the stylus 22 is made a slightly heavier than the weight of the portion of the arm 6 from the fulcrum shaft 33 to the end of the balance weight 44, due to the unbalancing force between both weights, the upper end of the pin 46 slowly ascends while being abutted against the cam face of the eccentric cam 48. Meanwhile, the stylus 22 slowly descends to abut against the outer surface of the object 23 to be measured without any impact. In this condition, if the driving motor 7 is driven again to rotate the feed screwshaft 9 through the gearing mechanism 8 and move the Y-direction detecting mechanism 5 through the nut member 11 and connector 12 rightward in FIG. 1, then the stylus 22 is moved rightward, vertically moving in accordance with the irregularities of the contour of the outer surface of the object 23 to be measured. This vertical motion of the stylus 22 is converted into rotations of the arm 6, i.e., of the first and second arms 18, 20 about the fulcrum shaft 33, the rotations of the first and second arms 18, 20 are converted into a motion of the core shaft 70 secured to the second arm 20 through the bracket 71, and the value of displacement of the core shaft 70 is detected by the differential transformer 69 serving as the contour signal detecting means. In this case, the centers of the coil 73 and core 74 of the differential transformer 69 are positioned on the reference plane P when the arm 6 is in the arm reference position, and hence, when the arm 6 rotated in any direction, the core 74 and coil 73 are adapted to change the positional relationship therebetween in a completely symmetrical manner. While, the value of displacement of the Y-direction detecting mechanism 5 in the direction X is detected by detecting rotation of the feed screwshaft 9 by means of the rotation detector 10 consisting of the rotary encorder, and the displacement in this direction X, i.e. the feeding, and the displacement in the aforesaid direction Y are detected and recorded on a record paper by the recorder 90, so that the measurement of the contour of the outer surface of the object 23 to be measured can be carried out.

In measuring the object 23 to be measured, when there are no large irregularities on the contour of the outer surface of the object 23, there arises little problem. However, if there are large irregularities, the so-called errors in circular arcs may raise problems. More specifically, it is ideal that the stylus 22 normally moves in the vertical direction (direction Y). However, the motion of the stylus 22 actually is the rotational movement about the fulcrum shaft 33. Consequently, if the vertical movement of the stylus 22, i.e., the rotational angle of the arm 6 exceeds a certain level in relation to the distance between the fulcrum shaft 33 and the stylus 22, then the component in the direction X of the displacement due to the elevation of the stylus 22 becomes large to a not negligible extent, which results in errors in measurement requiring some correction. In this embodiment, this correction is carried out by the circular arc error correcting means consisting of the support link 75, connecting link 78 and the like. Now, if it is assumed that the stylus 22 is moved upward, then the first arm 18 rotates in the clockwise direction, and the second arm 20 and the support link 75 integrally formed on the second arm 20 also rotate in the clockwise direction. While, the connecting link 78 connected to this support link 75 through the bearing 76 and the pivot 77 is connected to the stands 81 of the arm support member 13 through the pivot 79 and the bearing 80, and hence, this connecting link 78 is rotated in the counter-clockwise direction, and the connecting link 78 and the second arm 20 tend to be displaced bendingly upwardly at the position of the pivot 77. By this, the distance between the pivot 79 fixedly supported by the stand 81 and the fulcrum shaft 33 tends to be contracted. However, due to the fixed supporting of the pivot 79, the fulcrum shaft 33 moves on the needles 36 leftward in FIG. 2 through the agency of the bearing 35, whereby the first arm 18 and the stylus 22 move leftward. Consequently, the higher the stylus 22 ascends, the more leftward the stylus 22 is moved through the action of the correcting means. Whereas, as viewed from the rotation of the stylus 22 about the fulcrum shaft 33, due to the component in the direction X of the displacement by the turning action of the arm 6 in accordance with the elevation of the stylus 22, the higher the stylus 22 ascends, the more rightward the stylus 22 is moved. The abovedescribed both actions offset each other, and finally, the stylus 22 ascends substantially vertically, thus enabling to prevent the errors in circular arcs from occurring.

Description will now be given of the damage preventing means for preventing the stylus 22 and the object 23 to be measured from being damaged in the case the stylus 22 falls into a deep groove formed in the object 23 or the stylus 22 is caught at the inlet of the transverse hole formed in the object 23 when inserted. Now, if it is supposed that, while moving rightward in FIG. 2, the stylus 22 falls into a deep groove or the like, then the stylus 22 is caught by the inner wall of the deep groove, while, the Y-direction detecting mechanism 5 tends to continue rightward moving, whereby a force of a high value acts on the stylus 22. This force is imparted to the second compression coil spring 30 having a large diameter of the energizing means 25 through the first arm 18 secured to the stylus 22 and the sliding disk 27 unlodgingly secured to the arm 18 by the set-screw 26. With this arrangement, if the force exceeds a predetermined value, then the second compression coil spring 30 is flexed, and the first arm 18 and the second arm 20 slide on each other in the axial direction thereof. This sliding of the first arm 18 on the second arm 20 is imparted through the screw shaft 38 to the actuating member 39, which actuates the microswitch 41 serving as the detecting means, whereby the driving motor 7 is stopped in operation. This stops the Y-direction detecting mechanism 5 in movement, so that the stylus 22 and the object 23 to be measured can be prevented from being broken or damaged. In this case, in the second compression coil spring 30, the spring constant is determined such that the stylus 22 is compressed by a force giving no damage to the stylus 22. Furthermore, in the case the stylus 22 or the left end face of the first arm 18 comes into abutting contact with the inlet and the like of the transverse hole while the stylus 22 moves leftward in FIG. 2, the first arm 18 is subjected to a force pressing the first arm 18 rightward. By this, the first arm 18 projects from the sliding disk 27 against the first compression coil spring 29 confined between the flange 28 of the first arm 18 and the sliding disk 27, the first arm 18 and the second arm 20 slide on each other in the axial direction thereof as aforesaid, and this sliding actuates the microswitch 41 which stops the driving motor 7, thereby preventing the stylus 22 from being broken and the like or the first arm 18 being deformed and the like.

Description will now be given of the case the left half portion of the first arm 18, i.e., the distal arm 18B is rotated at the portion of joint 21 to direct the stylus 22 upward and measure the contour of the upper surface of the inner wall of the transverse hold formed in the object 23 to be measured. In order to direct the stylus 22 upward for measurement, it is necessary to take the measurement in such a condition that, in contrast to the above, an upwardly energizing force is applied to the stylus 22, whereby the stylus 22 comes into contact with the object 23 to be measured under a force of a comparatively low value. To do this, the balance weight 44 may be moved for adjustment, which is, however, troublesome because, when the stylus 22 is restored to be directed downward, the balance weight 44 should be moved again for readjustment. Therefore, to apply the upwardly energizing force to the stylus 22 without moving the balance weight 44, there are provided the rotary member 57, the coil spring 59 and so forth. More specifically, when the rotary member 57 is positioned as indicated by a broken line in FIG. 2, the coil spring 29 is in the slackened condition and no energizing force acts on the spring engaging pin 56, and consequently, no energizing force is applied to the arm 6. While, if the finger grip 62 is rotated to set the rotary member 57 at the position indicated by a chain line in FIG. 2 through the rotary shaft 61, then the coil spring 59 is stretched, whereby a force pulling rightward in FIG. 2 is applied to the spring engaging pin 56. By this, the screw shaft 38 is energized in the clockwise direction about the fulcrum shaft 33, and the arm 6 is energized in the clockwise direction as well. If this energizing force applied by the coil spring 59 is properly selected, then the upwardly directed energizing force of a predetermined value can be applied to the stylus 22 without moving the balance weight 44, and the measurement can be effected on the upper surface and the like of the inner wall of the transverse hole formed in the object 23 to be measured.

In this embodiment as described above, there is provided the damage preventing means, wherein the arm 6 is constituted by a pair of arms, i.e., the first and second arms 18, 20 which are slidable on each other, these first and second arms 18, 20 are held in place by the energizing means 25, and the relative movement between the first and second arms 18, 20 is detected by the microswitch 41 serving as the detecting mechanism, which stops the driving motor 7 in operation, so that the stylus 22 can be effectively protected. Furthermore, the cylindrical connecting link 78 is used as the circular arc error correcting means and the arm 6 is extended through this connecting link 78, so that the instrument can be rendered compact in size. Further, the connecting link 78 is formed to have a comparatively thin wall thickness. Consequently, in assembling the bearings 76, 80 with the pivots 77, 79, if the bearings 76, 80 are slightly excessively driven into the pivots 77, 79, then the connecting link 78 is flexed accordingly, with the result that the looseness generated between the bearings 76, 80 and the pivots 77, 79 due to the long-term service is absorbed by the connecting link 78, whereby no looseness is generated in the long-term service. The core shaft 70 is fixedly mounted on the periphery of the second arm 20 through the bracket 71, so that the construction of mounting the core shaft 70 can be simplified, and moreover, the movement of the arm 6 can be accurately imparted. The arm 6 is supported by the bearings 35 and the needles 36 through the fulcrum shaft 33 in order to follow the movements of the first and second arms 18, 20 in the axial direction due to the provisions of the damage preventing means for the stylus 22 and the object 23 to be measured, and of the circular arc error correcting means, so that the contact between the bearing 35 and the needle 36 is made at a point, so that smooth motion can be effected, and moreover, a flat and smooth surface, with which the bearings 35 come into contact, can be provided by use of the needles 36 inexpensively. Further, the movement of this fulcrum shaft 33 is made in the condition where the bearings 35 are in abutting contact with the needles 36 due to the weight of the arm 6 of the balance weight 44 and so forth, so that the fulcrum shaft 33 can be moved with low friction and the movement of the fulcrum shaft 33 does not change the arm 6 in its height, which can remain constant, and moreover, the construction can rendered simple and compact in size as compared with other constructions in which the arm is suspended by use of a link, a cross spring and the like. Furthermore, the differential transformer 69 is used as the contour signal detecting means and the center of this differential transformer 69 is set on the reference plane P, so that the errors due to the turning direction of the arm 6 can be avoided. Furthermore, this differential transformer 69 does not require any new link and the like and its construction is simplified, so that it can be manufactured inexpensively. Further, the differential transformer 69 is not projected in the direction being separated from the reference plane P in relation to the arm 6, the instrument as a whole can be rendered compact in size. The arm 6 is provided such that, when the stylus 22 is set on the reference plane P, i.e., the arm 6 is at the arm reference position, at least a section of the axial line of the arm 6 disposed between the fulcrum where the arm 6 is pivoted and the fixed fulcrum of the connecting link 78 is adapted to be set substantially on the reference plane P, whereby a force of an excessively high value such as a bending moment is rarely to be applied to the arm 6, so that distortion and the like can be prevented from being generated in the arm 6, thereby enabling to minimize the errors in measurement. Further, the arm 6 and the parts associated therewith are set substantially on the reference plane P when the arm 6 is set at the arm reference position, so that accumulation of errors can be minimized. Furthermore, there are provided the rotary member 57 positioned by means of the click motion mechanism 64 and the coil spring 59 connected at one end thereof to this rotary member 57 and the rotary member 57 is made rotatable with the finger grip 62, so that the direction of applying the measuring force to the stylus 22 can be readily changed over without requiring to adjust the balance weight 44.

In addition, in working the present invention, in addition to the abovedescribed construction, such constructions wherein both arms 18 and 20 are slidable on each other in the axial direction may be adopted that the first arm 18 receives therein the second arm 20 or both arms are not formed into tubular shapes and are disposed in parallel to each other. Further, the arm 6 may be formed into a rod shape connected to the arm support member 13. In this case, the detecting means for the damage preventing means may detect the relative displacement between the arm 6 and the arm support member 13. Further, the energizing means 25 is not limited to the first and second compression coil springs 29, 30 which are dually disposed, and any other construction may be adopted. Furthermore, construction is not limited to one wherein, when a force of an excessively high value is applied to the stylus 22, the driving motor 7 is stopped in operation as in the abovedescribed embodiment, but such a construction may be adopted that the stylus 22 is protected by any other means such as a warning buzzer. Furthermore, in the abovedescribed embodiment, description has been given of an example in which the differential transformer 69 is interposed between the fulcrum shaft 33 and the pivot bearing 79. However, the present invention is not limited to this, but, for example, the differential transformer 69 may be provided rightwardly of the fulcrum shaft 33 or leftwardly of the pivot bearing 79 in FIG. 3. In short, it suffices that the central position of the coil 73 and core 74 of the differential transformer 69 is on the reference plane P. Further, in the abovedescribed embodiment, description has been given of an example in which the coil 73 of the differential transformer 69 is secured to the side of the arm support member 13 and the core 74 is secured to the side of the arm 6, however, the present invention is not limited to the above, but, the coil 73 may be secured to the side of the arm 6 and the core 74 may be secured to the arm support member 13. Furthermore, the contour signal detecting means is not limited to the differential transformer 69, but other ordinary means such as the difference in electrostatic capacity may be used. Further, the circular arc error correcting means is not limited to one for mechanical correcting as in the abovedescribed embodiment, but one, in which a signal from the contour signal detecting means is electrically corrected, may be adopted. Furthermore, the connecting link 78 is not limited to one being of a ring shape in cross section, but one being of a letter 'U' shape in cross section with one side of the ring being open, in which case, the through-hole 82 is replaced with an extended groove. Further, the connecting link 78 may be divided into two disposed at opposite sides of the arm 6 and may be supported at the sides of the turning surface of the arm 6. In short, it suffices that the connecting link 78 is one through which the arm 6 can pass in substantially a straight line. Furthermore, in the abovedescribed embodiment, the arm 6 is supported by two bearings 35 and two needles 36 through the fulcrum shaft 33, however, the present invention is not limited to this, but, such arrangement may be adopted that the bearings 35 and the needles 36 may be omitted, a pair of ridges integrally formed on the arm support member 13 are provided in the axial direction of the arm 6, the upper surfaces of these ridges are finished to provide flat, smooth and straightened surfaces and the fulcrum shaft 33 is directly supported by these ridges, or, that one bearing 35 and also one needle 36 are used, and the arm 6 is supported by the bearing 35 disposed in a direction perpendicularly intersecting the axis of the arm 6 at a position passing through the axis of the arm 6.

What is claimed is:

1. A contour measuring instrument for measuring the contour of an object, said instrument comprising: an arm support member movable in a predetermined direction, an arm assembly having one end portion rotatably supported on said arm support member and provided at the other end thereof with a stylus, contour signal detecting means for measuring displacement of said arm assembly due to abutment of the stylus against an object to be measured while said arm support member is being fed in said predetermined direction, circular arc error correcting means for correcting errors in measured value caused to the stylus due to shifts in position in the feeding direction of the arm support member when said stylus is displaced following the contour of the object to be measured, said correcting means including a fulcrum of rotation for rotatably supporting the arm assembly in relation to the arm support member which fulcrum is movable in a direction along said predetermined direction of feeding of the arm support member, a connecting link having one end rotatably supported by said arm assembly and the other end rotatably supported by a fixed fulcrum on the arm support member and, with the tip end of said stylus positioned on a reference plane incorporating therein said arm assembly fulcrum and said fixed fulcrum of said connecting link, at least the length axis of the arm assembly portion between the fulcrum of rotation of the arm and the fixed fulcrum of the connecting link is substantially aligned with said reference plane, said connecting link having a throughhole or an extended groove through which the arm assembly can be extended, and the arm assembly is extended through and outwardly from said throughhole or extended groove, said fulcrum of rotation of the arm assembly being adapted to move in said predetermined direction of the arm support member while being abutted against a straightened guide surface provided on the arm support member.

2. In a contour measuring instrument comprising a Y-direction detecting mechanism including an arm assembly carrying a stylus wherein a Y-direction detecting mechanism and an object to be measured are movable relative to each other in a predetermined feeding direction other than said Y-direction so that a configuration of the object to be measured can be measured by displacement in the Y-direction of the arm assembly due to abutment of the stylus against the object to be measured and subsequent movement in the feeding direction of the stylus relative to the object to be measured, said Y-direction detecting mechanism comprising:
an arm support member rotatably supporting said arm assembly;
a circular arc error correcting means having a guide means provided on said arm support member for linearly movably guiding a fulcrum of rotation of said arm assembly in a direction parallel to said predetermined direction, and a connecting link, one end of which is rotatably supported by said arm assembly and the other end of which is rotatably supported by a fixed fulcrum on said arm support member so that the circular arc error of said arm assembly can be corrected through causing a linear movement in said predetermined direction of said fulcrum of rotation of the arm assembly in accordance with rotating angle of the arm assembly due to a displacement of said stylus; and contour signal detecting means for detecting a movement value in the Y-direction of said stylus in response to a displacement of said arm assembly.

3. A contour measuring instrument as set forth in claim 2, wherein, with the tip end of said stylus is positioned on a reference plane incorporating said fulcrum of rotation of the arm assembly and said fixed fulcrum of said connecting link, at least a portion of the axis of the arm assembly portion between said fulcrum of rotation of the arm assembly and said fixed fulcrum of the connecting link being adapted to be substantially aligned with said reference plane.

4. A contour measuring instrument as set forth in claim 2, wherein said connecting link has a through-hole or an extended groove through which the arm assembly can be extended, and the arm assembly is extended through said through-hole or extended groove, and further, extended outwardly therefrom.

5. A contour measuring instrument as set forth in claim 4, in which said connecting link has opposite side walls on opposite sides of said through hole or extended groove, said walls normally being flexed toward each other at said one end and other end of said connecting link by said rotatably supported engagement with said arm assembly and said fixed fulcrum on said arm support member so as to resist development of looseness in such rotatable support.

6. A contour measuring instrument as set forth in claim 2, wherein said arm assembly comprises a first arm, one end of which is rotatably supported on said arm support member and a second arm, one end of which is pivoted on said connecting link, said first and second arms being slidable with respect to each other in the axial direction thereof, and energizing means for energizing said first and second arms to normally be in a predetermined positional relationship and detecting means for detecting relative movement between said first and second arms effected against said energizing means.

7. A contour measuring instrument as set forth in claim 2, wherein said arm assembly comprises a distal arm mounting said stylus and a proximal arm connected to said distal arm through a joint, whereby the direction of tip end of said stylus is changeable by reversing said distal arm about the joint.

8. A contour measuring instrument as set forth in claim 7, wherein said joint offsets radially the proximal and distal arms by a distance equal to the radial separation of the tip end of the stylus from the axis of said distal arm such that said reversing of said distal arm about the joint leaves the tip end of the stylus on the axis of the proximal arm.

9. A contour measuring instrument as set forth in claim 7, having balancing means engaging said arm assembly for causing the tip end of said stylus to engage one side of an object to be measured with any desired positive measuring force, and an independent resilient biasing means actuable for urging the arm assembly in the opposite direction, so as to apply said stylus to the opposite side of said workpiece with a corresponding positive work force when said direction of the tip end of the stylus has been changed by said reversing of said distal arm about said joint.

10. A contour measuring instrument as set forth in claim 2, wherein said contour signal detecting means is a differential transformer, the central position of a coil and a core of said differential transformer being on a reference plane incorporating therein the axis of rotation of said arm assembly and parallel to the feeding direction of the arm support member, with the tip end of the stylus set on said reference plane.

11. A contour measuring instrument for measuring the contour of an object, said instrument comprising: an arm support member movable in a predetermined direction, an arm assembly having one end portion rotatably supported on said arm support member and provided at the other end thereof with a stylus, contour signal detecting means for measuring displacement of said arm assembly due to abutment of the stylus against an object to be measured while said arm support member is being fed in said predetermined direction, damage preventing means for detecting a force exceeding a predetermined value applied to said arm assembly in the axial direction thereof so as to make it possible to prevent the stylus from being broken and the object to be measured from being damaged, wherein said arm assembly comprises a pair of arms slidable on each other in the axial direction thereof, and said damage preventing means includes energizing means for energizing said arms to be in a predetermined positional relationship in the normal condition and detecting means for detecting relative movement between said pair of arms effected against said energizing means.

12. A contour measuring instrument as set forth in claim 11, in which said detecting means comprises a first switch means interposed between said pair of arms for detecting axial movement of one in either direction with respect to the other, motor means responsive to said detecting for causing said arm assembly to separate the tip end of said stylus from said object to be measured, and further switch means responsive to positioning of the movable part of said motor means for turning off said motor means after a sufficient movement thereof.

* * * * *